United States Patent [19]
Barwick

[11] 3,925,986
[45] Dec. 16, 1975

[54] AIR ENGINE
[76] Inventor: William M. Barwick, Rte. 5, Box 234, Washington, N.C. 27889
[22] Filed: July 8, 1974
[21] Appl. No.: 486,646

[52] U.S. Cl. ................... 60/398; 60/412; 417/100
[51] Int. Cl.² ........................................ F03B 13/12
[58] Field of Search ............ 60/497, 502, 398, 407, 60/409, 412; 417/100, 330

[56] References Cited
UNITED STATES PATENTS
2,484,183  10/1949  Paulson........................... 417/100 X Primary Examiner—Allen Ostrager
Attorney, Agent, or Firm—Cushman, Darby & Cushman

[57] ABSTRACT

An apparatus for utilizing the power generated by the rise and fall of ocean tides is disclosed. A tidal chamber is provided wherein the rise of the tide creates pressure within the tidal chamber, the pressure then being transported to actuate a usable power device. As the tide falls, a partial vacuum is created within the tidal chamber, the partial vacuum also being used to operate the power mechanism.

4 Claims, 3 Drawing Figures

AIR ENGINE

BACKGROUND OF THE INVENTION

A. Field of the Invention

The present invention relates to an apparatus for utilizing the power generated by the rise and fall of ocean tides. A tidal chamber is provided wherein the rise of the tide creates pressure within the tidal chamber, the pressure then being transported to actuate an engine. As the tide falls, a partial vacuum is created within the tidal chamber, the partial vacuum also being used to operate the engine.

Another embodiment of the present invention utilizes a turbine having impellars. The turbine is rotated by pressure created in a tidal chamber caused by the rise of the tide. When the fall of the tide causes a partial vacuum within the tidal chamber a valve is actuated which enables the partial vacuum to impart motion to the turbine. A pressure-operated diaphragm device is used to actuate the valve and is operable upon pressure or partial vacuum created within the tidal chamber.

B. Description of the Prior Art

Devices for utilizing the rise and fall of the tide or utilizing wave action to impart motion to mechanical systems is well known in the prior art. In U.S. Pat. No. 1,623,341, there is disclosed an ocean compressed air power device wherein air is compressed in large volume and stored in tanks. Ocean wave and tide actuated air compressors and vacuum producers are operated to continuously force air into tanks. A series of cylindrical auxiliary air storage and vacuum tanks are actuated by reciprocating cylinders. The reciprocating cylinders are actuated by waves which force the cylinders upwardly. The cylinders descend by gravity, valves being arranged to provide a vacuum in several of the tanks and to provide pressure in other designated tanks. U.S. Pat. No. 1,623,341 requires a rather complex system incorporating various pressure and vacuum tanks used in conjunction with reciprocating cylinders and valves.

In U.S. Pat. No. 378,452 there is set forth a tide water elevator or system of utilizing the rise and fall of tides. Tide water enters through an inlet and is used to compress air which is led through a further pipe to any desired point and used as a motive power. The compressed air is used to force water from one reservoir to a higher level. U.S. Pat. No. 378,452 does not suggest the use of pressure or a vacuum created within a tank by the rise and fall of the tide to be directly used on a pumping device.

A tide-powered unit for generating electrical power using a cylinder and piston is described in U.S. Pat. No. 3,690,790. The piston is operatively connected to a float whereby both will rise and fall as the tide comes in and goes out. The rise and fall of the tide causes a pumping of tide water into a reservoir. When the reservoir fills, the water stored therein can be used to turn hydro-electric generator for generating electric power. U.S. Pat. No. 3,690,790, while employing a movable piston, does not set forth a device wherein pressure or partial vacuum created within a tidal chamber is transported and used to actuate a pumping apparatus.

U.S. Pat. No. 3,697,764 provides for a method and apparatus for generating electricity wherein motion of waves is converted into energy in the form of compressed air which is stored in large containers. Compressed air flowing from the containers is utilized to drive turbine-generators to generate electricity. Air is selectively withdrawn from the containers and utilized to generate electricity in any convenient manner such as by an air driven turbine-generator. The apparatus disclosed in U.S. Pat. No. 3,697,764 is equipped with a plurality of vertically reciprocal floats each of which is preferably coupled to a plurality of air compressors. Air is compressed during the up and down strokes of the floats, the motion of the floats being actuated by wave motion. U.S. Pat. No. 3,697,764 does not contemplate the use of a tidal chamber for the production of pressurized air or the production of a partial vacuum for actuating a pump during the rise and fall of the tide.

An ocean powered compressor is employed in U.S. Pat. No. 3,268,154 and uses an air compression apparatus powered by the motion of ocean waves. This patent, similar to those hereinabove described, does not employ the novel pressure and partial vacuum created in a tidal chamber by tidal action.

SUMMARY OF THE INVENTION

A primary object of the present invention is to provide for a low pressure air engine wherein air pressure or partial vacuum created within a tidal chamber by the rise or fall of the tide is employed to directly actuate a reciprocating apparatus which can be used for pumping fluid from one point to another, or made to turn wheels, generators, line shafts, and other power devices. Another embodiment of the present invention has for its primary purpose the use of pressure or partial vacuum created within a tidal chamber by the rise or fall of the tide to directly contact the vanes of a turbine or like device for generating electrical power, etc.

Another object of the present invention is to provide for a low pressure air engine which is comprised of a minimum number of moving parts and which does not require complex construction.

Another object of the present invention is to provide for a low pressure air engine in which air or partial vacuum is used to actuate a plate within a diaphragm, the plate in turn being connected by rods to pumps, crankshafts, generators, etc. The pumping cylinders etc., may be advantageously employed on either side of the diaphragm plate and during actuation of the diaphragm plate one piston may be used to draw in a fluid to be pumped, while the other piston is used to outwardly pump the fluid.

Yet another object of the present invention is to provide for a low pressure air engine or low pressure turbine which may be driven by pressure or partial vacuum created in a tidal chamber wherein the tidal chamber may be advantageously constructed under bridges, seawalls, docks, under foundations of factories, warehouses, etc.

A further object of the present invention is to provide for a low pressure air engine and low pressure turbine which may be advantageously used with a tidal chamber located on presently useless tidal flats. Top soil could be placed over the tidal chambers and a city could be built thereupon and heat, power, lights, utilities, etc., essential to modern living could be readily provided by the apparatus of the present invention.

Additional objects of the present invention reside in the specific construction of the embodiments hereinafter particularly described in the specification and shown in the several drawings.

DETAILED DESCRIPTION OF THE INVENTION

Figure 1:
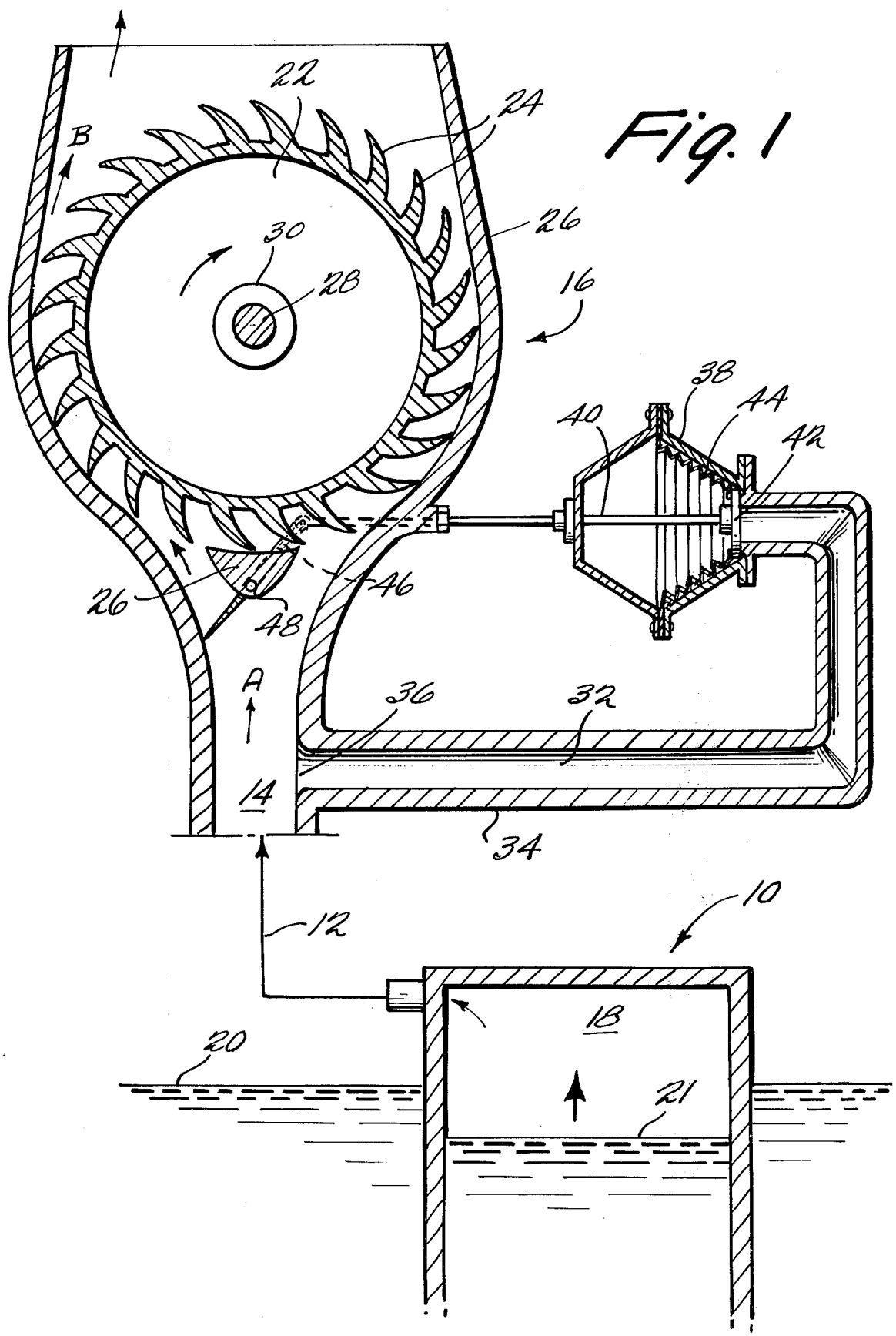
FIG. 1 is a cross-sectional view of the low pressure turbine of the present invention in the partial vacuum cycle and illustrates the relationship of the tidal chamber and the valve actuating diaphragm.
Figure 1A:
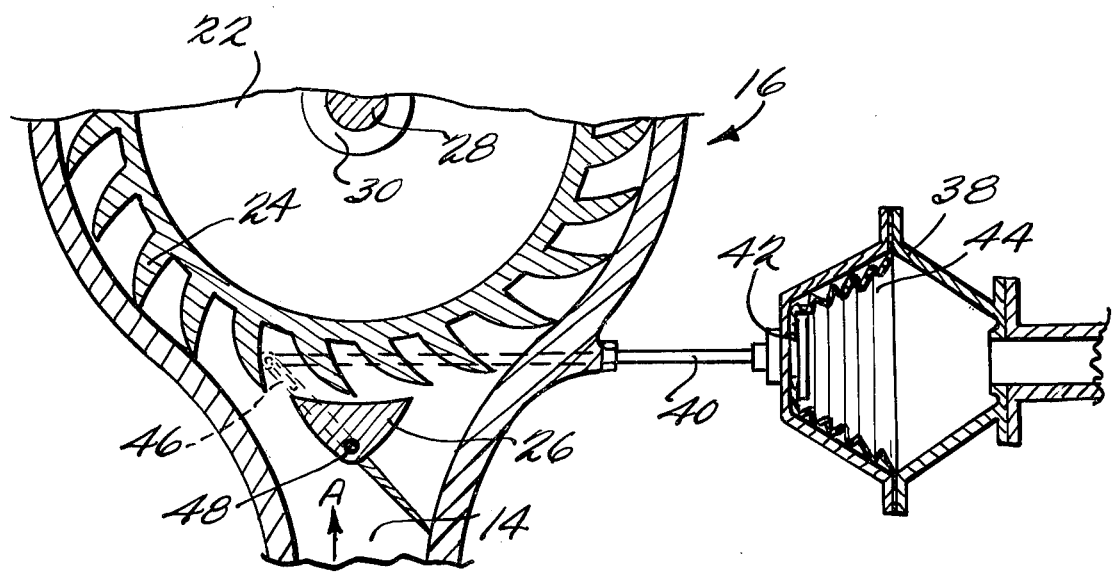
FIG. 1a is a fragmented cross-sectional view of the low pressure turbine in the pressure cycle.

Referring now to the drawings, there is illustrated in FIG. 1a an embodiment of the low pressure turbine. A tidal chamber 10 is located under a bridge, seawall, dock, etc., and is operatively connected by means of suitable piping 12 to the inlet region 14 of turbine 16. Tidal chamber 10 contains an interior space 18 above the level of the water 20. Low pressure turbine 16 comprises a wheel 22 having a plurality of impellars 24 well known in turbine design. An external shell 26 is constructed around turbine 22 so that turbine 22 may be rotatably journalled by means of a shaft 28 and bearing 30 to external shell 26.

Arranged adjacent to inlet 14 is passageway 32 within a pipe 34 or other similar means for the transport of low pressure or partial vacuum through an inlet 36 to diaphragm case 38. Diaphragm case 38 is constructed in a well known manner and is air tight. An actuating rod 40 is connected to a plate 42, plate 42 being secured to diaphragm case 38 by means of diaphragm 44.

Rod 40 is disposed through one end of diaphragm case 38 and is slidably engaged with valve lever 46. Valve 46 is pivotably secured to turbine shell 26 by means of a conventional pivot 48.

From a consideration of FIGS. 1 and 1a, operation of the hereinabove described low pressure turbine will now be set forth. As the water level 21 rises within chamber 18 by virtue of a rising tide, air pressure will be created within chamber 18 and forced outwardly through conduit 12 into opening 14 and through inlet 36 so air pressure travels through opening 14 and through conduit 32. The air pressure caused by a rising tide will displace plate 42 towards the left which will push rod 40 so that valve 46 is in the position as shown in FIG. 1a. Thus, it may be readily appreciated that the air pressure will flow in the direction of arrow A and strike impellars 24 imparting rotary movement to turbine 22. Valve 46 also prevents air pressure from traveling to the right side of the turbine.

When the tide falls, a partial vacuum is created within space 18 in tidal chamber 10. The partial vacuum will pull or displace plate 42 to the right and thereby move valve 46 to the position as indicated in FIG. 1. The partial vacuum will exert a pulling force and tend to rotate turbine 22 in the direction of arrow B, the same direction as turbine 22 is rotated when the tide is rising.

Of course, it must be realized that there will be a period at low tide when there is no movement of the water, and also a period at high tide when no movement is present. Power cannot be produced at these times because neither pressure nor partial vacuum is created within space 18 in tidal chamber 10. To overcome such periods, a reservoir constructed on a nearby hillside or mountain top could store surplus water which could be used to produce power at it fell back to the sea. Also, machines and other equipment which were driven by turbine 22 could be driven by compressed air during these down periods. The compressed air could have been previously supplied by the rotation of impellar 22.

Figure 2:
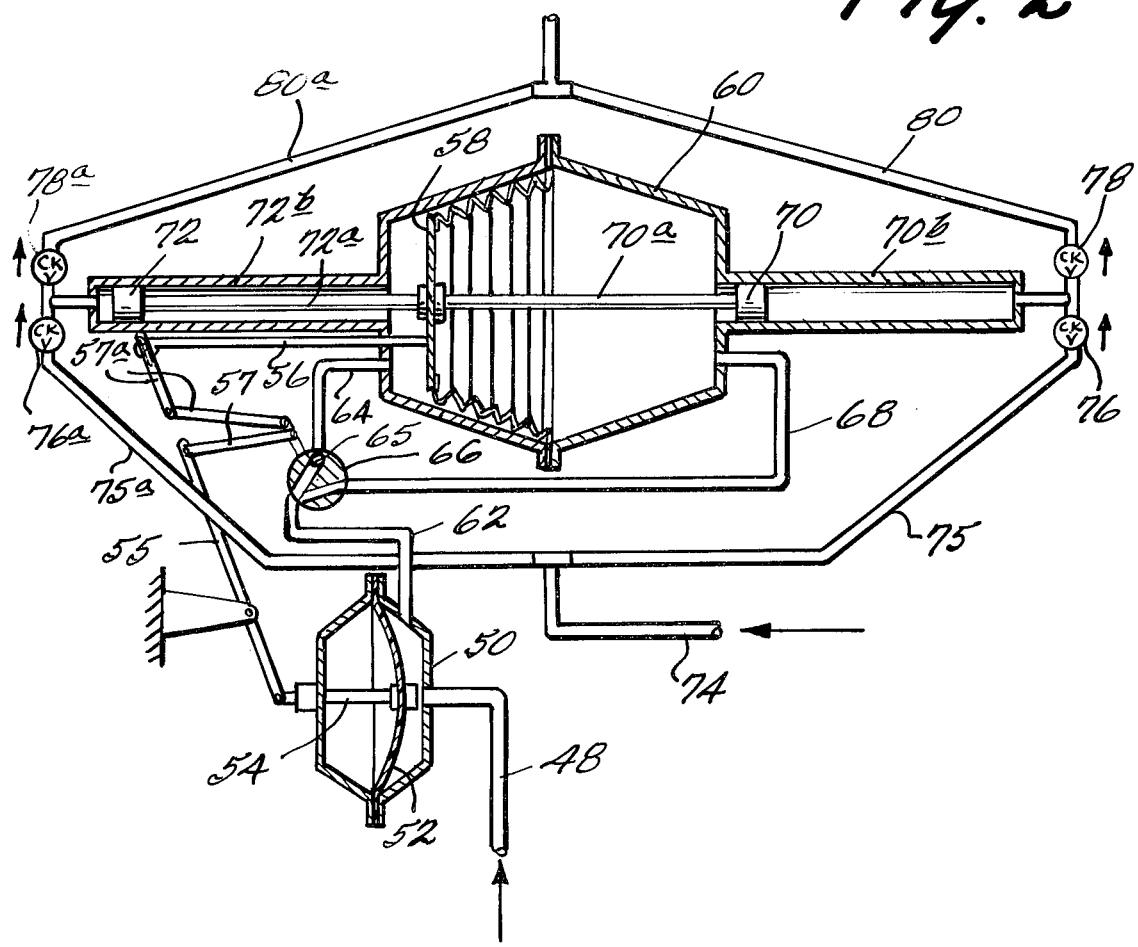
FIG. 2 is a cross-sectional view of the low pressure air engine illustrating the pumping mechanism actuated by pressure or partial vacuum created within the tidal chamber.

Another embodiment of the present invention is an engine incorporating a pump as illustrated in FIG. 2. Here, the pressure or vacuum is supplied from a tidal chamber to a conduit or passageway 48. Diaphragm case 50 comprises a movable diaphragm 52 which is operatively connected by means of linkages 54, 55 and 57 to valve 66. Linkages 56 and 57a connect diaphragm plate 58 located in engine diaphragm case 60 to valve 66. Assuming that the tide is rising, pressure is transported through conduit 48 and as the pressure increases pressure transported through conduits 62 and 64 imparts a moving force to engine diaphragm plate 58 to thereby move plate 58 toward the right.

Linkages 54, 55, 56, 57 and 57a are arranged so that passage of low pressure air through conduit 64 will be passed through valve 66 until plate 58 is near the extremity of the right-hand side of engine diaphragm case 60. At this position, the aforementioned linkages reverse valve 66 so that conduit 64 is closed to pressure and opened to exhaust to enable pressure to escape outwardly from valve 66 as plate 58 returns to the left from the extreme right-hand position. An exhaust port 65 is provided in valve 66. Conduit 68 then is open to pressure from tidal chamber through conduits 48 and 62. As the pressure traveling through conduits 48, 62 and 68 displaces plate 58 back towards the left, valve 66 will open conduit 64 and close conduit 68 at a predetermined left-hand position of plate 58 to thereby allow low pressure to move plate 58 to the right once again. It is contemplated that different types of open and close valves could be used for valve 66. The process is continually repeated as pressure from the tidal chamber is transported through conduit 48. Diaphragm case 50 comprising diaphragm 52 is employed to further aid in the actuation of valve 66.

When the tide falls, and a partial vacuum is created within the tidal chamber, vacuum force is thereby used to actuate engine diaphragm plate 58 in a manner similar to that as hereinbefore described, the distinction being that vacuum pressure travels through conduits 48, 62 and 64, partial vacuum also being urged through conduit 68 when valve 66 is in the proper position.

Pistons 70 and 72 are connected by means of rods 70a and 72a to engine diaphragm plate 58. The pistons 70 and 72 are slidably movable within cylinders 70b and 72b respectively. As pistons 70 and 72 are displaced within their respective cylinders, fluid is drawn through conduit 74 and during the end of a suction stroke of piston 70 (as illustrated in FIG. 2) fluid is drawn through conduit 74 and 75 through check valve 76 and then as the piston 70 is displaced to the right fluid is passed through check valve 78 and through conduit 80 outwardly to an end use. Piston 72 performs the same function for drawing fluid through conduit 75a and check valve 76a to be pumped through check valve 78a through conduit 80a. The fluid used may be air when the end product is desired to be compressed air for running various types of machinery, etc. The fluid may be other gaseous fluid depending upon the end result desired. Fluids such as oil or water could also be advantageously used. The end results of such a pumped fluid resulting from the structure of the aforedescribed low pressure air engine are numerous and many different uses are easily envisioned.

The low pressure air engine could also use rods 70a and 72a to drive machine components such as flywheels, etc. The low pressure air engine is not contemplated as being solely used as a fluid pumping device.

The various component parts of the low pressure turbine and air engine are contemplated as being constructed of steel or metal, with the tidal chamber being constructed of a concrete shell. The bellows portion of the diaphragm are contemplated as being constructed of materials typically used in such devices. Other materials could be advantageously used by those skilled in the art.

While the invention has been particularly shown and described with reference to the foregoing preferred embodiments thereof, it will be understoood by those skilled in the art that other changes in form and detail may be made therein without departing from the spirit and scope of the invention as defined in the appended claims.

What is claimed is:

1. In an air engine for utilizing power generated by the rise and fall of ocean tides, having a tidal chamber with an interior space in which pressure is created during the rise of the tide and in which a partial vacuum is created during the fall of the tide, a turbine connected to a power output and disposed in an inlet which is in communication with the interior space, and a valve disposed in the inlet between the turbine and the tidal chamber, the improvement comprising:

a valve control mechanism having an inlet conduit in communication with the tidal chamber upstream from the turbine, an air tight chamber in communication with the conduit and having a diaphragm member forming at least a portion of a wall of the chamber, an actuating rod connected at one end to the diaphragm member and an opposite end connected to the valve, whereby when air pressure increases in the tidal chamber due to a rising tide the diaphragm and actuating rod will be moved in one direction so as to move the valve to cause operation of the turbine by impingement of the air going out of the tidal chamber thereon, and whereby when air pressure decreases in the tidal chamber due to a lowering tide the diaphragm will be moved in an opposite direction so as to move the valve to cause operation of the turbine by impingement of the air going into the tidal chamber thereon.

2. An air engine for utilizing power generated by the rise and fall of ocean tides, comprising:

a tidal chamber having an interior space in which pressure is created during the rise of the tide and in which a partial vacuum is created during the fall of the tide; an air tight pressure chamber having a diaphragm member forming a partition which divides the chamber into two separate air tight portions and which is movable back and forth a predetermined distance so as to reduce the volume of either portion while expanding the volume of the other portion;

conduit means connecting each portion of the pressure chamber to the tidal chamber;

valve means associated with the conduit means for directing pressure or vacuum created in the tidal chamber to either one or the other of the portions of the pressure chamber while exhausting the other of the two portions;

reciprocating rod means connected to the diaphragm member and movable therewith for providing a power output;

linkage means connected to the valve means and associated with the diaphragm member to operate the valve means in response to movement of the diaphragm member for causing pressure or vacuum created in the tidal chamber to be introduced into one of the portions until the diaphragm has moved a predetermined distance and then causing the pressure or vacuum to be introduced into the other of the two portions to cause movement of the diaphragm in the opposite direction for a predetermined distance.

3. The air engine as described in claim 2 wherein said reciprocating rod means are secured to a pumping means.

4. The air engine as described in claim 3 wherein said diaphragm member further comprises a plate secured to at least one piston by means of a rod extending outwardly from the air tight pressure chamber surrounding said diaphragm member, said piston being displaceable within a cylinder means and connected by means of conduits or the like to a fluid to be pumped.

* * * * *